Oct. 15, 1963     C. VAN DER LELY ETAL     3,106,967
IMPLEMENT FOR WORKING THE GROUND
Original Filed Aug. 9, 1955
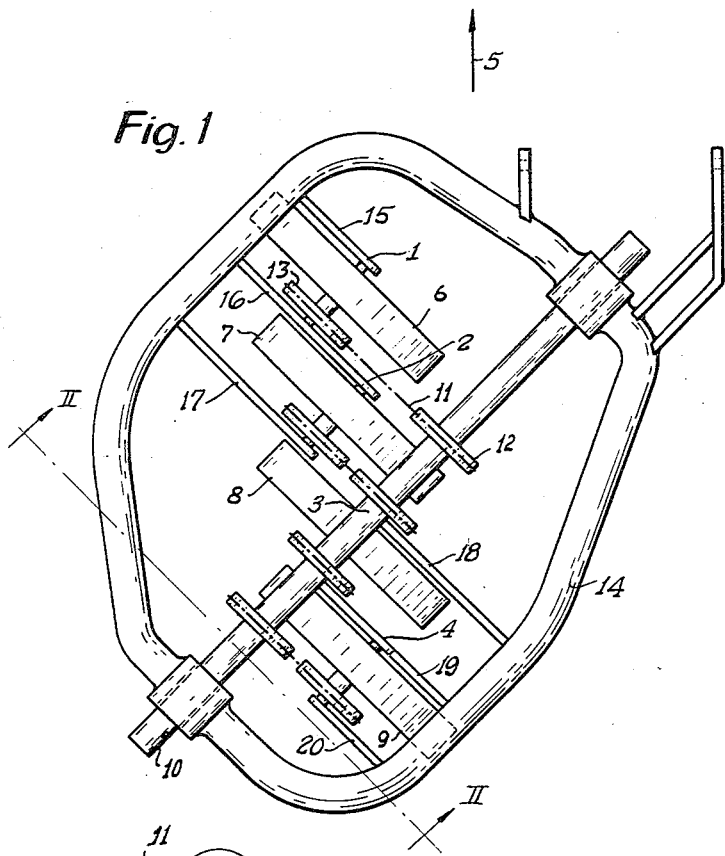
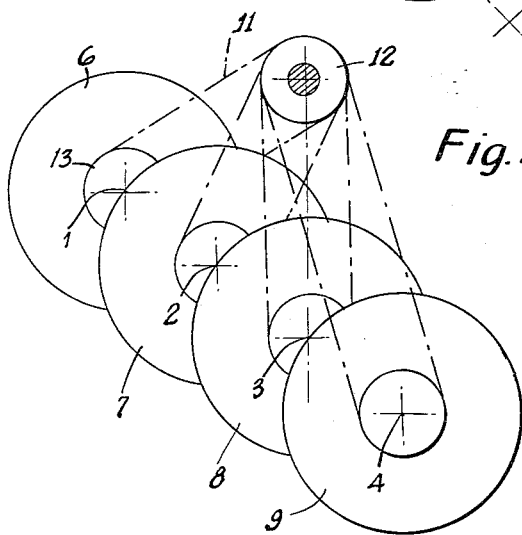
INVENTOR.
BY

3,106,967
IMPLEMENT FOR WORKING THE GROUND
Cornelis van der Lely, Zug, Switzerland, and Ary van der Lely, Maasland, Netherlands; said Ary van der Lely assignor to said Cornelis van der Lely
Original application Aug. 9, 1955, Ser. No. 527,384, now Patent No. 2,928,480, dated Mar. 15, 1960. Divided and this application Jan. 18, 1960, Ser. No. 3,135
Claims priority, application Netherlands Aug. 13, 1954
2 Claims. (Cl. 172—49)

This invention relates to implements for working the ground and of the kind adapted for use in digging the ground to a given depth along a given strip extending in the intended direction of travel of the implement. The invention relates more particularly to implements comprising at least one rotatable, power driven tilling member. This application is a divisional application of the United States Patent application Serial No. 527,384 (now Patent No. 2,928,480).

Known implements of the above mentioned kind usually produce a mixing of the upper layer and of the deeper layers of the ground. In certain cases, however, it is desired that the upper layer should be turned below the upturned lower layer, as is achieved with a conventional plough. However, the conventional plough requires, in most cases, a great tractive effort, which can often not be furnished by a tractor due to wheel slippage. Therefore, only a small part of the power of the tractor can be utilized.

It is an object of the invention to provide a machine in which the desired turning-over of the ground layers is obtained without the necessity for a great tractive effort.

With this and other objects in view there is provided an implement, of the above-mentioned kind, comprising several substantially parallel shafts disposed with their axes at an acute angle to the intended direction of travel of the machine, each shaft supporting a rotatable ground-tilling member, these members being arranged in succession one behind the other and at progressively lower levels so as to work substantially the same strip of soil by throwing it in a lateral direction, the leading (with respect to the intended direction of travel of the machine) member of two adjacent members being at a higher level than the lagging member, and the ground-tilling members being arranged to be driven in a manner such that at locations near the ground the members have a component of movement directed backwardly with respect to the intended direction of travel of the machine.

For a better understanding of the invention, reference will now be made to the accompanying drawings in which:

FIGURE 1 is a plan view of one embodiment of the invention incorporated into an implement, and FIGURE 2 is a view taken on line II—II of FIGURE 1 with the frame and support arms deleted for purposes of clarity.

The machine illustrated in the drawing has a frame 14 adapted to be coupled to the rear end of a tractor. The frame is effective to support four shafts 1 to 4 by means of support arms 15—20. The shafts 1—4 are supported in succession one behind the other with respect to the intended direction of travel of the machine, as indicated by the arrow 5. The shafts 1 to 4 are arranged at an acute angle to the intended direction of travel and are situated progressively at lower levels towards the rear of the machine. Each shaft carries rotatable blades (not shown) which sweep cylindrical spaces 6 to 9. The blades are driven from a shaft 10 also mounted on the frame. For example, the blades on the shaft 4 are driven by means of a chain 11 which passes over a sprocket wheel 12 mounted on the shaft 10, and over a sprocket wheel 13 connected with the blades, the other blades being driven in a similar manner.

The blades are driven in a direction such that they move obliquely backwards (with reference to the direction 5) when in their lower positions. This arrangement has the advantage that the resistance encountered by the blades when scraping away a layer of ground, produces a forward reaction, so that the tractive effort required for the whole machine is materially reduced.

The arrangement of the blades, so that they operate at a progressively greater depth towards the rear of the machine, insures that the topmost ground is first displaced by the foremost blades, and thereafter the ground at the lower levels is displaced by the following deeper set blades. The ground is displaced into an adjacent furrow which has already been made.

The oblique positioning of the tilling members with respect to the direction of travel of the machine leads to the great advantage that the displaced ground is directed transversely to the direction of travel and hence is clear of succeeding tilling members.

What is claimed is:
1. An implement having a normal direction of travel and adapted for working the ground traversed, said implement comprising a plurality of ground tilling members of substantially equal diameter, means supporting each of said members for rotation about an axis which forms an acute angle relative to said direction of travel of the implement, the axes of all of said members being parallel, said members being longitudinally aligned in said direction of travel of the implement to form a furrow extending in the direction of travel as the implement traverses the ground, said members being fixedly positioned at progressively lower levels in a direction opposite the direction of travel to cause deepening of the furrow as said implement traverses the ground, and means for driving the ground tilling members in rotation about the respective axes thereof in a direction such that each member has a direction component at the ground which is opposite the direction of travel of the implement and lateral of said direction, said means which drives said members being operative to cause each member to displace earth laterally of the direction of travel outside the furrow and clear of the succeeding members, such that each successive member causes successive deepening of the furrow while producing a forward push on the implement in the direction of travel thereof.

2. An implement as claimed in claim 1 wherein said ground tilling members are at least three in number and said members are successively vertically spaced by equal amounts so that said members respectively cause substantially equal quantities of earth to be removed from the furrow to cause successive deepening of the furrow by substantially equal amounts.

References Cited in the file of this patent
UNITED STATES PATENTS

| | | |
|---|---|---|
| 1,004,167 | Henton | Sept. 26, 1911 |
| 1,113,684 | Phillips | Oct. 13, 1914 |
| 1,162,457 | Crane | Nov. 30, 1915 |
| 1,316,990 | White | Sept. 23, 1919 |
| 1,365,192 | Petit | Jan. 11, 1921 |
| 1,721,462 | Metz | July 16, 1929 |